(12) United States Patent
Wu et al.

(10) Patent No.: US 12,398,689 B1
(45) Date of Patent: Aug. 26, 2025

(54) WAVE ENERGY POWER GENERATION DEVICE

(71) Applicant: QINGDAO UNIVERSITY OF SCIENCE AND TECHNOLOGY, Qingdao (CN)

(72) Inventors: Junfei Wu, Qingdao (CN); Ping Fu, Qingdao (CN); Longjiang Song, Qingdao (CN); Yalin Yuan, Qingdao (CN); Luning Jia, Qingdao (CN); Yuxuan Geng, Qingdao (CN); Xinglin Du, Qingdao (CN); Mingwei Chen, Qingdao (CN)

(73) Assignee: QINGDAO UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 19/026,220

(22) Filed: Jan. 16, 2025

(30) Foreign Application Priority Data

Sep. 20, 2024 (CN) .......................... 202411310691.5

(51) Int. Cl.
  *F03B 13/14* (2006.01)
(52) U.S. Cl.
  CPC ........ *F03B 13/14* (2013.01); *F05B 2220/706* (2013.01); *F05B 2260/4031* (2013.01)

(58) Field of Classification Search
  CPC ................ F03B 13/14; F05B 2220/706; F05B 2260/4031
  See application file for complete search history.

(56) References Cited

U.S. PATENT DOCUMENTS

| | | | | |
|---|---|---|---|---|
| 3,567,953 | A * | 3/1971 | Lord ...................... | F03B 13/262 290/53 |
| 4,184,336 | A * | 1/1980 | Lamberti .............. | F03B 13/186 60/507 |
| 2007/0132246 | A1* | 6/2007 | Hirsch ................ | F03B 13/1845 290/42 |
| 2015/0211478 | A1* | 7/2015 | Dragic ................ | F03B 13/1875 60/505 |

* cited by examiner

*Primary Examiner* — Joseph Ortega
(74) *Attorney, Agent, or Firm* — Westbridge IP LLC

(57) ABSTRACT

A wave energy power generation device includes a plurality of up-down moving mechanisms configured to move up and down along a spiral rod under the action of waves, a mass block arranged at a lower part of the power generation device; a buoyancy barrel arranged in the middle of the power generation device, a guide rail arranged on one side of the up-down moving mechanism, and a spiral rod. Through the interaction of the up-down moving mechanism and the spiral rod, the up-down movement of waves can be converted into rotational kinetic energy, a scroll spring is used for storing energy, then the rotating speed is stabilized through an escapement mechanism, a power generation assembly accelerates energy output, and finally a generator is driven to generate power.

9 Claims, 5 Drawing Sheets

WAVE ENERGY POWER GENERATION DEVICE

CROSS-REFERENCE TO RELATED APPLICATIONS

This application claims priority to Chinese Patent Application No. 202411310691.5, filed on Sep. 20, 2024, the content of which is incorporated herein by reference in its entirety.

TECHNICAL FIELD

The application relates to the technical field of electrical machinery, in particular to a wave energy power generation device.

BACKGROUND

Human exploration and development of renewable energy is becoming particularly important in the context of increasingly depleted global land resources. Ocean is used as the widest resource treasure on the earth, and has huge and diversified energy, including wave energy, tidal energy, tidal current energy, temperature difference energy, salt difference energy and the like. The wave energy is used as a high-quality ocean energy, and has received wide attention by taking the advantages of wide distribution, large reserve, large energy density, simple energy conversion device and the like.

The wave energy power generation devices are of various types and can be classified into shore-based type and floating type according to installation positions. According to the intermediate energy conversion form, the devices can be classified into mechanical, direct-drive, friction and piezoelectric devices. Mechanical devices are mainly a gear transmission or a hydraulic system driving a generator to rotate and generate electricity. The direct-drive device structure is similar to a linear motor, and directly converts linear motion of the float into electric energy. The friction device converts float motions into reciprocating motion through a mechanical structure, and electricity is electrified through friction. Piezoelectric devices mostly generate electricity by repeatedly extruding piezoelectric materials through internal vibration. According to the energy harvesting mode, the devices are divided into an oscillating buoy type, an oscillating water column type, a raft type, a nodding duck type, a pendulum type, an overwave type device and the like.

The raft type wave energy power generation device absorbs energy generated by relative rotation between two raft bodies through a hydraulic device. The two raft bodies fluctuate along with waves to continuously absorb energy, and the pendulum type wave energy power generation device is high in manufacturing cost and poor in damage resistance.

According to the oscillating water column type wave energy power generation device, under wave fluctuation, gas of internal chamber gas enters and exits from a small opening in the upper side to drive a turbine to rotate, generally, two types of Wilse turbines and impact turbines exist, the Wilse turbines adopt symmetrical airfoil blades, the turbine turns the same when gas enters and exits, and the impact turbines adopt flow guide plates to ensure that the turbine turns the same when gas enters and exits. Due to the large loss of the air pushing turbine, the efficiency of oscillating the water column is not high.

The structure of the pendulum type wave energy power generation device is similar to that of the raft type, and the difference is that the raft type floats on the sea surface, two raft bodies are not fixed, and relative movement is formed between the two raft bodies. One end of the pendulum type is fixed, only one floater swings back and forth, and the defect is that most mechanisms are underwater, and the corrosion resistance requirement is high.

Researchers have widely studied wave energy conversion devices from the aspects of theory, simulation, experiments and the like, and proposed various new structures and methods. The wave energy conversion device has rapid development from the initial mechanical driving of the generator to new power generation methods such as piezoelectric, electromagnetic and nano friction, researchers mostly adopt horizontal swing type and vertical swing type for the design of the miniature wave energy power generation buoy as a primary energy harvesting system, new technologies such as piezoelectric and electromagnetic are innovatively integrated in the design, the design of the traditional design through secondary transmission to the generator is replaced, and the loss in the energy transmission process is reduced. Although the development of wave energy power generation devices presents a thriving state, some problems exist in the research of wave energy conversion devices.

Most new power generation methods such as piezoelectric, electromagnetic and nano-friction are only in the experimental research stage and have a distance from actual application, the reliability of long-term use of these technologies needs to be confirmed, and the manufacturing cost is high. The progress of the wave energy power supply buoy is slow, and less research is performed on the wave energy conversion device for supplying power to the submersible buoy.

SUMMARY

The application provides a wave energy power generation device, and aims to provide a new technical scheme for offshore power generation on the premise of ensuring simple structure and controllable cost.

To achieve the above object, the present application provides the technical solution as follows.

A wave energy power generation device comprises:
  a plurality of up-down moving mechanisms configured to move up and down along a spiral rod under the action of waves;
  a mass block provided at a lower part of the power generation device for maintaining stability of the device in water;
  a buoyancy barrel arranged in the middle of the power generation device and configured to maintain balance of the up-down moving mechanism;
  a guide rail disposed on one side of the up-down moving mechanism and configured to limit a movement direction of the up-down moving mechanism; and
  the spiral rod interacting with the up-down moving mechanism to drive the up-down moving mechanism to move up and down, and the up-down moving mechanism converting the up-and-down moving into rotational kinetic energy to drive the generator to rotate.

Further, the up-down moving mechanism comprises a driving gear assembly, a transmission gear assembly, a scroll spring box gear, an escapement mechanism and a power generation assembly;

the transmission gear assembly configured to drive an output gear to always rotate in the same direction when the up-down moving mechanism moves up and down;

the scroll spring box gear being in transmission connection with the transmission gear assembly and storing rotational kinetic energy within the scroll spring;

the escapement mechanism, configured to stabilize a rotation speed of a gear transmission system, the gear transmission system configured to comprise the scroll spring box gear, a third transmission gear, and a gear acceleration box, so that energy within the scroll spring cannot be released suddenly; and the power generation assembly comprising the third transmission gear, the gear acceleration box and a generator, wherein the scroll spring box gear is meshed with the third transmission gear; and the third transmission gear drives the gear acceleration box and the generator to convert rotational kinetic energy into effective kinetic energy for power generation.

Further, the up-down moving mechanism is packaged in a corrosion-resistant shell to prevent seawater erosion and ensure long-term operation of the device.

Further, a side surface of the corrosion-resistant shell is arc-shaped, and two end surfaces are tapered.

Further, the driving gear assembly comprises a sealing bearing, a driving gear and a rotating wheel;

the sealing bearing installed between the corrosion-resistant shell and the rotating wheel to prevent water from entering the inside of the device; and the driving gear and the rotating wheel fixed together, and an inner wall of the rotating wheel provided with ball heads matched with the spiral rod, so that up-down motion is converted into rotary motion.

Further, the transmission gear assembly comprises a transmission gear, a clockwise one-way gear, a counterclockwise one-way gear, an output gear and a reversing gear, and the transmission gear comprising a first transmission gear and a second transmission gear;

the driving gear engaged with the first transmission gear and the second transmission gear simultaneously, the clockwise one-way gear configured to be coaxial with the first transmission gear, and the counterclockwise one-way gear configured to be coaxial with the second transmission gear; and the clockwise one-way gear meshed with the output gear, and the counterclockwise one-way gear meshed with the output gear through the reversing gear.

Further, the scroll spring box gear is coaxial with the output gear, and the output gear transfers rotational kinetic energy to the scroll spring box.

Further, the escapement mechanism comprises an escapement wheel, an escapement lever, a balance wheel, and a hairspring;

the escapement wheel connected with the third transmission gear through the axis of the escapement wheel, and a tooth part of the escapement wheel interacting with a pallet of the escapement lever; the escapement lever installed on the frame of the escapement mechanism through the lever shaft of the escapement lever and driving the balance wheel to swing; and the balance wheel connected with the frame of the escapement mechanism through the hairspring, and the hairspring controlling the reciprocating motion of the balance wheel.

Further, the wave energy power generation device further comprises a mounting plate, an upper mounting frame and a lower mounting frame; the gear assembly arranged on the mounting plate and the upper mounting frame, the escapement mechanism, the up-down moving mechanism and the power generation assembly arranged on the mounting plate and the lower mounting frame, the mounting plate provided with a guide hole, and the guide rail configured to pass through the guide hole.

Further, the mass block is arranged at the lower part of the central shaft of the buoyancy barrel.

The present application achieves the following beneficial effects.

Using the wave energy power generation device, energy conversion is achieved through interaction of the up-down moving mechanism and the spiral rod, the structure is simple, and the cost is low; the vertical movement of waves can be efficiently converted into rotational kinetic energy, the conversion process is further optimized, energy is stored by utilizing the scroll spring, then the rotating speed is stabilized through the escapement mechanism, the power generation assembly accelerates the energy output, and finally the generator is driven to generate power, so that the energy conversion efficiency is improved in the process.

Using the wave energy power generation device, the corrosion-resistant shell is adopted to package the up-down moving mechanism, and waterproof measures such as a sealing bearing are arranged, so that seawater erosion can be effectively prevented, and the service life of equipment is prolonged. In addition, the design of the mass block and the buoyancy barrel enhances the stability and wind wave resistance of the device in water, and ensures that the device can stably operate under various sea conditions.

Using the wave energy power generation device, by introducing the escapement mechanism, the rotating speed of the gear transmission system is stably controlled, the sudden release of energy within the scroll spring is prevented, and therefore the stability and efficiency of the power generation process are improved.

BRIEF DESCRIPTION OF THE DRAWINGS

In order to more clearly illustrate the embodiments of the present application or the technical solutions in the prior art, the drawings that need to be used in the description of the embodiments or the prior art will be briefly described below, obviously, the drawings in the following description are only some embodiments of the present application, and for those skilled in the art, other drawings may be obtained according to the structures shown in these drawings without creative work.

DETAILED DESCRIPTION OF THE EMBODIMENTS

Figure 1:
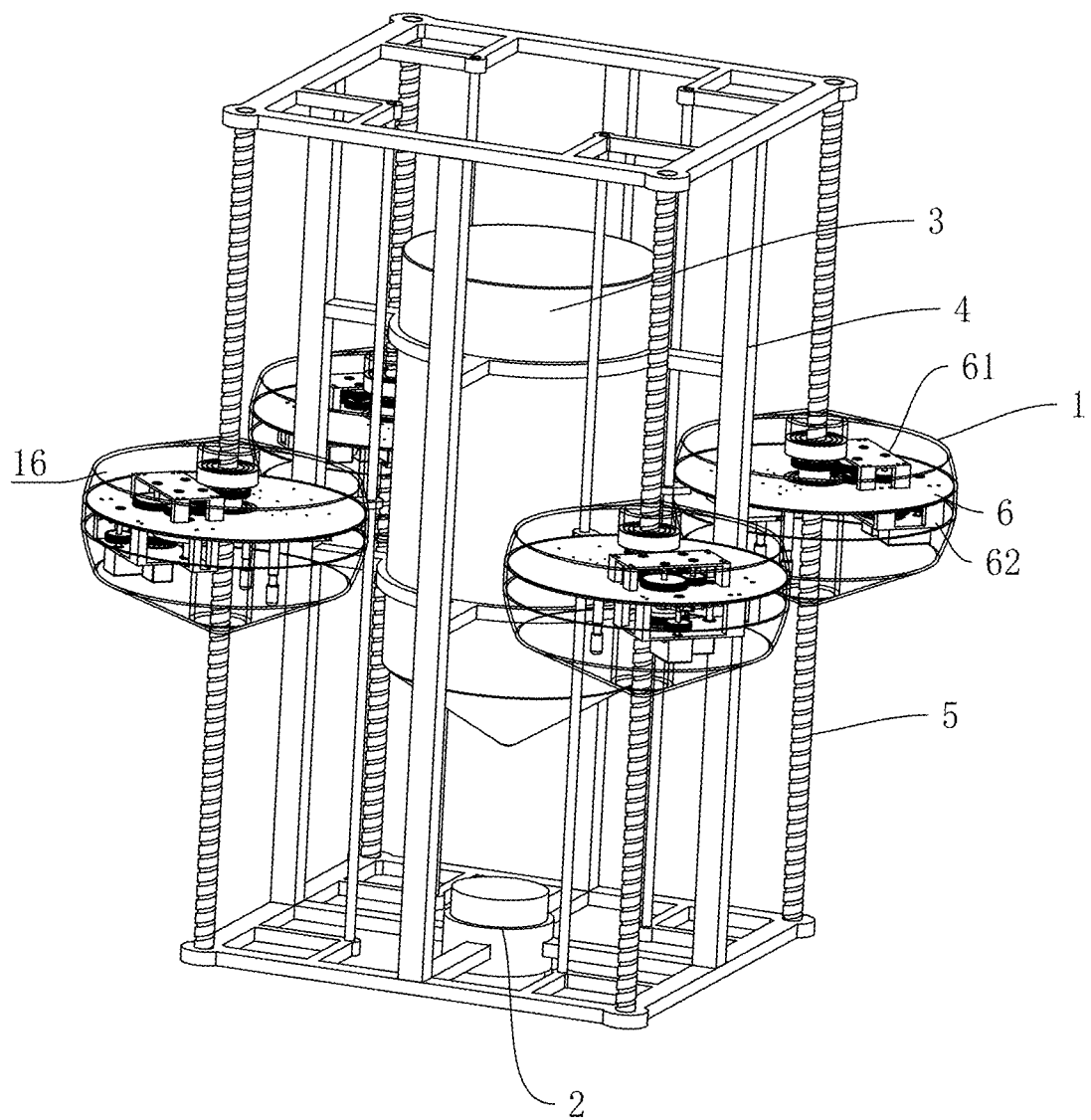
FIG. 1 is a schematic diagram of an overall structure of the wave energy power generation device.

The following clearly and completely describes the technical solutions in the embodiments of the present application with reference to the drawings in the embodiments of the present application, and obviously, the described embodiments are only a part of the embodiments of the present application, but not all the embodiments. Based on the embodiments of the present application, all other embodiments obtained by those skilled in the art without creative efforts fall within the protection scope of the present application.

It should be noted that, if a directional indication (for example, up, down, left, right, front, and back) is involved in this embodiment of the present application, the directional indication is only used to explain a relative position relationship, a motion status, and the like between components in a specific posture (as shown in the drawings), and if the specific posture changes, the directional indication changes accordingly.

In addition, if the embodiments of the present application relate to descriptions of "first", "second", and the like, the descriptions of "first", "second", and the like are merely used for description purposes, and cannot be understood as indicating or implying relative importance or implicitly indicating a quantity of indicated technical features. Thus, a feature defining "first" and "second" may explicitly or implicitly include at least one of the features. In addition, if "and/or" appears in the entire text, three parallel solutions are included, and "A and/or B" is used as an example, and comprises an A solution, a B solution, or solutions that both A and B satisfy. In addition, the technical solutions among the various embodiments may be combined with each other, but must be based on those of ordinary skill in the art, and when the combination of the technical solutions contradicts or cannot be realized, it should be considered that the combination of the technical solutions does not exist or fall within the protection scope claimed by the present application.

Figure 2:
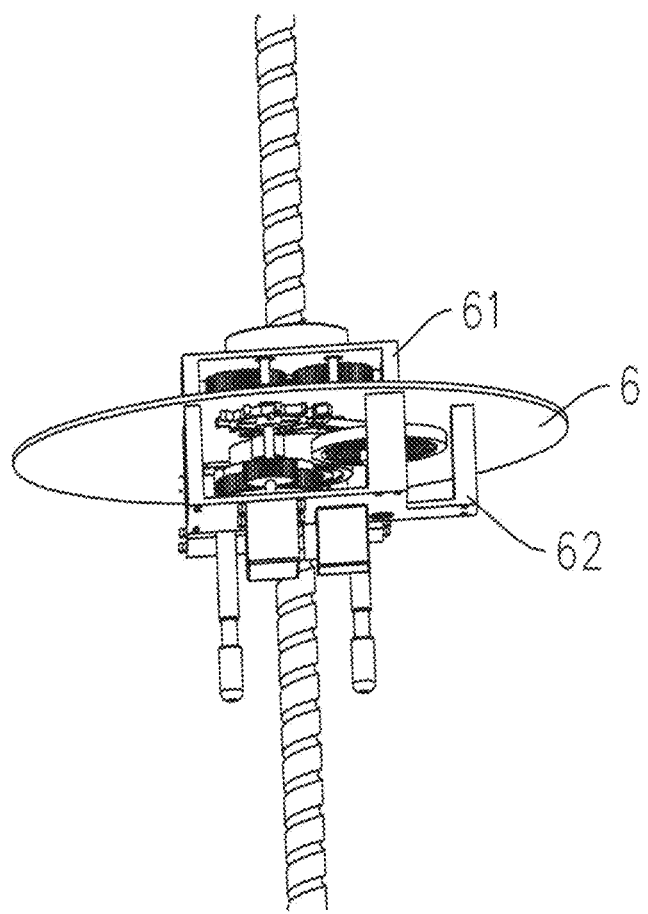
FIG. 2 is a perspective view of an internal structure of an up-down moving mechanism of the wave energy power generation device.
Figure 3:
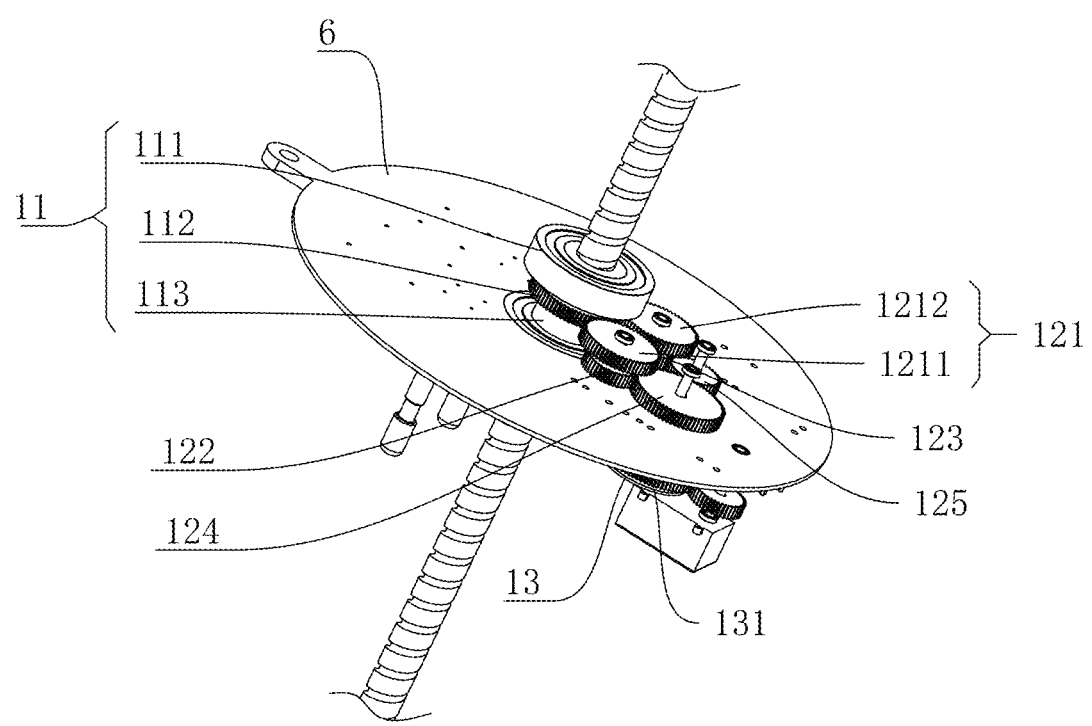
FIG. 3 is a structural diagram of an upper part of a mounting plate of an up-down moving mechanism of the wave energy power generation device.
Figure 4:
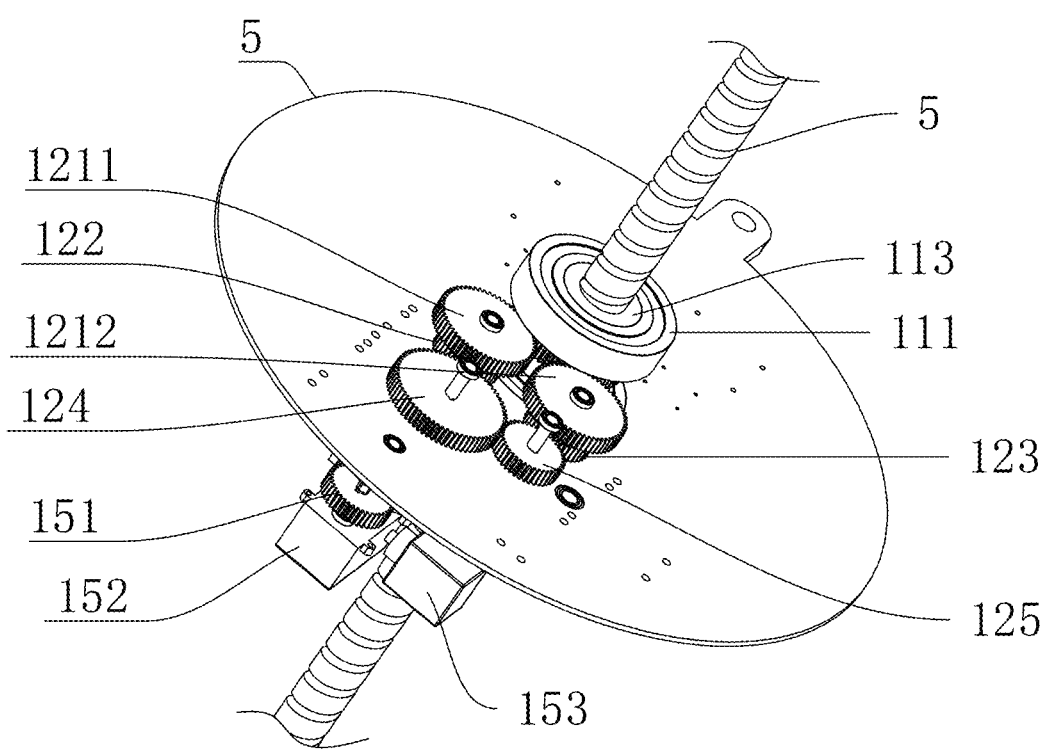
FIG. 4 is a structural diagram of an upper part of a mounting plate of an up-down moving mechanism of the wave energy power generation device.
Figure 5:
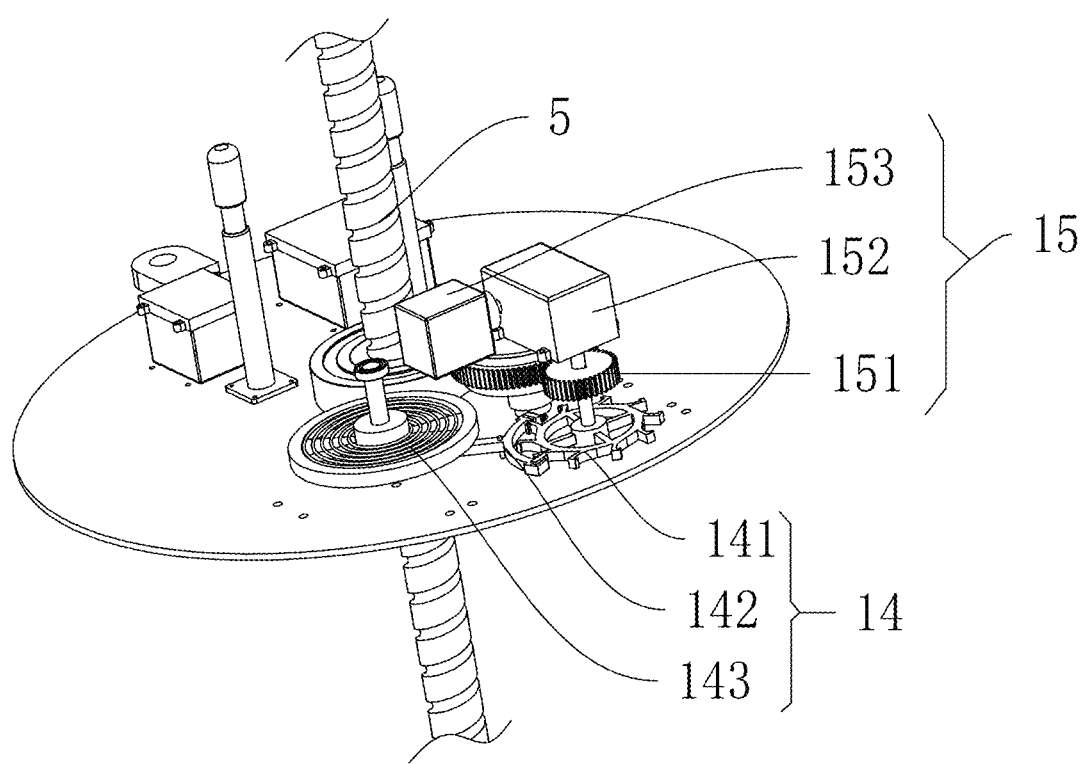
FIG. 5 is a structural diagram of a lower part of a mounting plate of an up-down moving mechanism of the wave energy power generation device.
Figure 6:
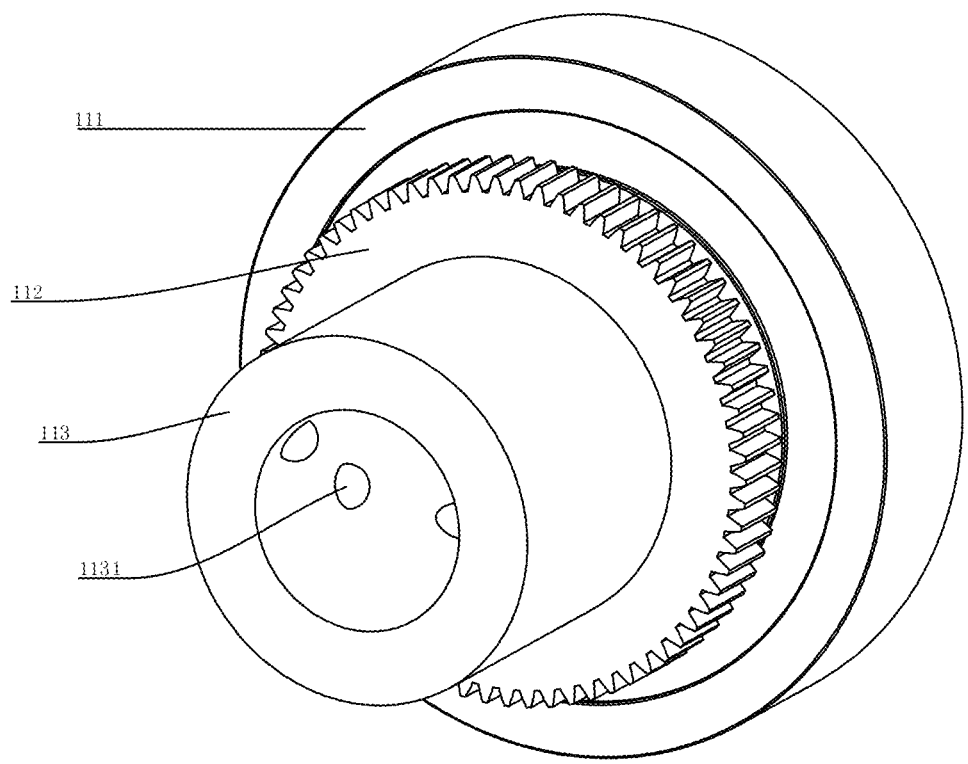
FIG. 6 is a structural diagram of a driving gear assembly of an up-down moving mechanism of the wave energy power generation device.

As shown in FIGS. 1-6, a wave energy power generation device comprises: a plurality of up-down moving mechanisms 1 configured to move up and down along a spiral rod 5 under the action of waves; the up-down moving mechanisms 1 are responsible for capturing the up-down movement of the waves and converting them into rotational kinetic energy.

A driving gear assembly 11 comprises a sealing bearing 111, a driving gear 112, and a rotating wheel 113. The sealing bearing 111 ensures that water does not enter the inside of the device, the driving gear 112 is fixed with the rotating wheel 113, the rotating wheel 113 is matched with the spiral rod 5 through a ball head 1131 on the inner wall, and when waves drive the spiral rod 5 to move up and down, the rotating wheel 113 rotates with the spiral rod 5, and then drives the driving gear 112 to rotate.

A transmission gear assembly 12 comprises a transmission gear 121 (first transmission gears 1211 and second transmission gears 1212), a clockwise one-way gear 122, a counterclockwise one-way gear 123, an output gear 124 and a reversing gear 125. These gears cooperate to ensure that the output gear 124 always rotates in the same direction regardless of the waves fluctuating up and down. The clockwise one-way gear 122 and the counterclockwise one-way gear 123 function through the reversing gear 125.

A scroll spring box gear 131 is coaxial with the output gear 124, receives and stores rotational kinetic energy transmitted by the output gear 124, and converts the rotational kinetic energy into elastic potential energy of the scroll spring.

An escapement mechanism 14 comprises an escapement wheel 141, an escapement lever 142, a balance wheel, and a hairspring 143. The escapement mechanism 14 stabilizes the rotating speed of a gear transmission system, prevents the sudden release of energy within the scroll spring, and ensures the stable operation of the power generation process. The escapement wheel 141 interacts with the escapement lever 142, and the rotation rhythm is controlled through adjustment of the balance wheel and the hairspring 143.

A mass block 2 is arranged at the lower part of the power generation device and is used for maintaining the stability of the device in water, increasing the stability of the device in water, preventing excessive shaking caused by wave action, and ensuring the stability and efficiency of the power generation process. The mass block 2 is arranged at the lower part of the central shaft of a buoyancy barrel 3 to maintain the stability of the equipment in water, and further prevent excessive shaking.

The buoyancy barrel 3 is arranged in the middle of the power generation device, and in this embodiment, the four up-down moving mechanisms 1 are located on four edges of the frame of the cuboid structure. The buoyancy barrel 3 is in the middle and is configured to maintain the balance of the up-down moving mechanism 1, so as to capture kinetic energy of waves.

A guide rail 4 is arranged on one side of the up-down moving mechanism 1 and is used for limiting the moving direction of the up-down moving mechanism 1 and preventing the up-down moving mechanism 1 from rotating integrally, so that the internal driving gear 112 rotates. The guide rail 4 is arranged on one side of the up-down moving mechanisms 1 to limit the moving direction of the up-down moving mechanisms 1, so that the up-down moving mechanisms 1 can move along a predetermined path, and the energy conversion efficiency is improved.

The spiral rod 5 interacts with the up-down moving mechanism 1 to drive the spiral rod 5 to move up and down, and the up-down moving mechanism 1 converts the up-down movement into rotational kinetic energy to drive the generator 153 to rotate.

The power generation device further comprises a mounting plate 6, an upper mounting frame 61 and a lower mounting frame 62; the gear assembly is arranged between the mounting plate 6 and the upper mounting frame 61, the escapement mechanism 14, the up-down moving mechanism 1 and a power generation assembly 15 are arranged between the mounting plate 6 and the lower mounting frame 62, the mounting plate 6 is provided with a guide hole, and the guide rail 4 passes through the guide hole. As a supporting and fixing structure, it is ensured that the components can be assembled together in a predetermined manner to form a complete power generation device.

The up-down moving mechanism 1 comprises the driving gear assembly 11, the transmission gear assembly 12, the scroll spring box gear 131, the escapement mechanism 14 and the power generation assembly 15; the transmission gear assembly is used for driving the output gear 124 to always rotate in the same direction when the up-down moving mechanism 1 moves up and down; the scroll spring box gear 131 is in transmission connection with the transmission gear assembly and stores rotational kinetic energy within the scroll spring; and the escapement mechanism 14 is used for stabilizing the rotating speed of the gear transmission system, so that the energy within the scroll spring cannot be suddenly released.

The power generation assembly 15 comprises a third transmission gear 151, a gear acceleration box 152 and a generator 153, the scroll spring box gear 131 meshes with the third transmission gear 151, and the third transmission gear 151 drives the gear acceleration box 152 and the generator 153 to convert rotational kinetic energy into effective kinetic energy for power generation.

The up-down moving mechanism 1 is packaged in a corrosion-resistant shell 16 to prevent seawater erosion and ensure long-term operation of the device. A side surface of the corrosion-resistant shell 16 is arc-shaped, and two end surfaces are tapered. The side surface is arc-shaped, the two end surfaces are conical, and the design is beneficial to reducing the water flow resistance and improving the efficiency of the device.

The driving gear assembly 11 comprises the sealing bearing 111, the driving gear 112, and the rotating wheel 113; the sealing bearing 111 is mounted between the corrosion-resistant shell 16 and the rotating wheel 113 to prevent water from entering the inside of the device; the driving gear 112 and the rotating wheel 113 are fixed together, and the inner wall of the rotating wheel 113 is provided with the ball heads 1131 matched with the spiral rod 5 to convert up and down motion into rotating motion.

The transmission gear assembly 12 comprises the transmission gear 121, the clockwise one-way gear 122, the counterclockwise one-way gear 123, the output gear 124 and the reversing gear 125, wherein the transmission gear 121 comprises a first transmission gear 1211 and a second transmission gear 1212; the driving gear 112 is meshed with the first transmission gear 1211 and the second transmission gear 1212 at the same time, the clockwise one-way gear 122 is coaxial with the first transmission gear 1211, and the counterclockwise one-way gear 123 is coaxial with the second transmission gear 1212; the clockwise one-way gear 122 is meshed with the output gear 124, and the counterclockwise one-way gear 123 is meshed with the output gear 124 through the reversing gear 125.

The clockwise one-way gear 122 and the counterclockwise one-way gear 123 are key components designed to ensure that the output gear 124 always rotates in the same direction. Such a design is critical for a wave energy power generation device, because the up-down fluctuation of waves may cause a change in the rotation direction, and if there is no such one-way mechanism, the generator 153 cannot continuously and effectively generate electricity.

The clockwise one-way gear 122 allows power transfer only when rotated in a clockwise direction. When the wave pushes the spiral rod 5 to rise, the up-down moving mechanism 1 moves upward, causing the driving gear 112 to rotate, and transmitting power to the clockwise one-way gear 122 through the first transmission gear 1211. At this time, the clockwise one-way gear 122 meshes with the output gear 124 and drives it to rotate clockwise.

The counterclockwise one-way gear 123 allows power transfer only when rotated counterclockwise. When the wave falls, the spiral rod 5 moves downward, the up-down moving mechanism 1 moves downward, and the driving gear 112 rotates reversely (i.e., counterclockwise). At this time, the driving gear 112 drives the counterclockwise one-way gear 123 to rotate through the second transmission gear 1212, and the counterclockwise one-way gear 123 transmits power to the output gear 124 through the reversing gear 125, so that the output gear 124 continues to rotate clockwise.

The reversing gear 125 functions to change the direction of power transfer so that the output gear 124 can remain rotating in one direction regardless of how the driving gear 112 rotates (clockwise or counterclockwise). The counterclockwise one-way gear 123 is connected to the output gear 124 through the reversing gear 125, so that even if the driving gear 112 rotates counterclockwise, the output gear 124 can still rotate clockwise.

In actual design, the one-way gear usually adopts a ratchet and pawl mechanism to achieve one-way rotation. When the one-way gear needs to transmit power in a specified direction, the pawl will catch the teeth on the ratchet wheel to prevent it from reversing. When there is no need to transmit power, the pawl disengages the ratchet under the action of a spring, allowing the ratchet to rotate freely without transmitting any torque.

In the wave power generation device, such a one-way mechanism ensures that the output gear 124 always rotates in a direction favorable for generating electricity. In this way, regardless of whether the waves cause the spiral rod 5 to move up and down, the rotation finally output to the generator 153 is continuous and consistent, thereby improving the power generation efficiency and the reliability of the system.

The scroll spring box gear 131 is coaxial with the output gear 124, and the output gear 124 transfers rotational kinetic energy into the scroll spring box 13. The escapement mechanism 14 comprises the escapement wheel 141, the escapement lever 142, the balance wheel and the hairspring 143; the escapement wheel 141 is connected with the third transmission gear 151 through the axis of the escapement wheel 141, and a tooth part of the escapement wheel 141 interacts with a pallet of the escapement lever 142; the escapement lever 142 is installed on the frame of the escapement mechanism 14 through the lever shaft of the escapement lever 142 and drives the balance wheel to swing; and the balance wheel is connected with the frame of the escapement mechanism 14 through the hairspring 143, and the hairspring 143 controls the reciprocating motion of the balance wheel.

The scroll spring box 13 and the escapement mechanism 14 play an important role in the wave energy power generation device, and are respectively responsible for storing energy and controlling the release speed of the energy, so as to ensure that the power generation process is stable and orderly.

The scroll spring box 13 is an energy storage device that comprises one or more tightly wound springs that are capable of compressing or twisting to store mechanical energy when stressed. When the force is removed, the springs will return to their original shape, releasing the previously stored energy.

In the wave energy power generation device, the scroll spring box gear 131 and the output gear 124 are coaxially mounted. As the output gear 124 rotates due to the action of wave energy, it twists the springs within the scroll spring box 13 and stores energy through gear meshing action. Once the wave energy is temporarily attenuated or lost, the springs begin to release the previously stored energy and continue to drive the gear to rotate, thereby ensuring a continuous supply of energy.

The escapement mechanism 14 comprises the escapement wheel 141, the escapement lever 142, the balance wheel, and the hairspring 143. The escapement wheel 141 is connected with the third transmission gear 151 through its axis, and a tooth portion of the escapement wheel 141 interacts with a pallet of the escapement lever 142. The escapement lever 142 is mounted on the frame of the escapement mechanism 14 through its lever shaft and drives the balance wheel to swing. The balance wheel is connected with the frame of the escapement mechanism 14 through the hairspring 143, and the hairspring 143 controls the reciprocating motion of the balance wheel.

As the escapement wheel 141 rotates, it swings the escapement lever 142 back and forth through interaction with the escapement lever 142. The swing of the escapement lever 142 controls the swing frequency of the balance wheel through connection with the balance wheel. The swing frequency of the balance wheel determines the speed of energy release, thereby controlling the rotational speed of the generator 153.

The above description is merely an optional embodiment of the present application, and is not intended to limit the patent scope of the present application, and any equivalent structural transformation made by using the specification and the drawings of the present application under the inventive concept of the present application, or the direct/indirect application in other related technical fields are included in the patent protection scope of the present application.

What is claimed is:

1. A wave energy power generation device, comprises:
   a plurality of up-down moving mechanism configured to move up and down along a spiral rod under the action of waves;
   a mass block provided at a lower part of the wave energy power generation device for maintaining stability of the wave energy power generation device in water;
   a buoyancy barrel arranged in the middle of a frame of the wave energy power generation device and configured to maintain balance of the plurality of up-down moving mechanism;
   a guide rail disposed on one side of the plurality of up-down moving mechanism and configured to limit a movement direction of the plurality of up-down moving mechanism; and
   the spiral rod configured to interact with the plurality of up-down moving mechanism to drive the plurality of up-down moving mechanism to move up and down, and the plurality of up-down moving mechanism configured to convert the up-down moving into rotational kinetic energy to drive a generator to rotate;
   wherein the plurality of up-down moving mechanism comprises a driving gear assembly, a transmission gear assembly, a scroll spring box gear, an escapement mechanism and a wave energy power generation assembly;
   the transmission gear assembly configured to drive an output gear to always rotate in the same direction when the plurality of up-down moving mechanism moves up and down;
   the scroll spring box gear configured to be in transmission connection with the transmission gear assembly and configured to store rotational kinetic energy within a scroll spring gear;
   the escapement mechanism, configured to stabilize a rotation speed of a gear transmission system, so that energy within the scroll spring cannot be released suddenly; and
   the wave energy power generation assembly comprising a third transmission gear, a gear acceleration box and the generator, the scroll spring box gear meshed with the third transmission gear, and the third transmission gear configured to drive the gear acceleration box and the generator to convert rotational kinetic energy into effective kinetic energy for the wave energy power generation.

2. The device according to claim 1, wherein the plurality of up-down moving mechanism is packaged in a corrosion-resistant shell to prevent seawater erosion and ensure long-term operation of the device.

3. The device according to claim 2, wherein a side surface of the corrosion-resistant shell is arc-shaped, and two end surfaces of the corrosion-resistant shell are tapered.

4. The device according to claim 2, wherein the driving gear assembly comprises a sealing bearing, a driving gear and a rotating wheel;
   the sealing bearing mounted between the corrosion-resistant shell and the rotating wheel to prevent water from entering the inside of the wave energy power generation device; and
   the driving gear and the rotating wheel fixed together, and an inner wall of the rotating wheel provided with ball heads matched with the spiral rod, so that up-down motion is converted into rotary motion.

5. The device according to claim 4, wherein the transmission gear assembly comprises a transmission gear, a clockwise one-way gear, a counterclockwise one-way gear, an output gear and a reversing gear, and the transmission gear comprising a first transmission gear and a second transmission gear;
   the driving gear configured to mesh with the first transmission gear and the second transmission gear simultaneously, the clockwise one-way gear configured to be coaxial with the first transmission gear, and the counterclockwise one-way gear configured to be coaxial with the second transmission gear; and
   the clockwise one-way gear configured to mesh with the output gear, and the counterclockwise one-way gear configured to mesh with the output gear through the reversing gear.

6. The device according to claim 5, wherein the scroll spring box gear is coaxial with the output gear, and the output gear transfers rotational kinetic energy into the scroll spring box.

7. The device according to claim 1, wherein the escapement mechanism comprises an escapement wheel, an escapement lever, a balance wheel and a hairspring;
   the escapement wheel connected with the third transmission gear through the axis of the escapement wheel, and a tooth part of the escapement wheel configured to interact with a pallet of the escapement lever; the escapement lever installed on a frame of the escapement mechanism through a lever shaft of the escapement lever and configured to drive the balance wheel to swing; and the balance wheel connected with the frame of the escapement mechanism through the hairspring, and the hairspring configured to control the reciprocating motion of the balance wheel.

8. The device according to claim 1, further comprises a mounting plate, an upper mounting frame and a lower mounting frame, wherein the gear assembly is arranged on the mounting plate and the upper mounting frame, the escapement mechanism, the plurality of up-down moving mechanism and the power generation assembly are arranged on the mounting plate and the lower mounting frame, the mounting plate is provided with a guide hole, and the guide rail is configured to pass through the guide hole.

9. The device according to claim 1, wherein the mass block is arranged at a lower part of a central shaft of the buoyancy barrel.

\* \* \* \* \*